US012088025B2

(12) United States Patent
Chiang

(10) Patent No.: US 12,088,025 B2
(45) Date of Patent: Sep. 10, 2024

(54) ANTENNA STRUCTURE

(71) Applicant: AUDEN TECHNO CORP., Taoyuan (TW)

(72) Inventor: Chi-Ming Chiang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 176 days.

(21) Appl. No.: 17/894,130

(22) Filed: Aug. 23, 2022

(65) Prior Publication Data

US 2023/0361473 A1 Nov. 9, 2023

(30) Foreign Application Priority Data

May 6, 2022 (TW) .................................. 111117060

(51) Int. Cl.
*H01Q 9/04* (2006.01)
*H01Q 1/38* (2006.01)

(52) U.S. Cl.
CPC ............. *H01Q 9/0428* (2013.01); *H01Q 1/38* (2013.01); *H01Q 9/0435* (2013.01)

(58) Field of Classification Search
CPC .. H01Q 1/38; H01Q 5/28; H01Q 5/35; H01Q 5/357; H01Q 5/378; H01Q 5/385; H01Q 5/392; H01Q 9/0407–9/0457
See application file for complete search history.

(56) References Cited

U.S. PATENT DOCUMENTS 10,854,978 B2 * 12/2020 Lim ..................... H01Q 1/2283
11,462,831 B2 * 10/2022 Choi .................... H01Q 21/065
2004/0056803 A1 * 3/2004 Soutiaguine ............. H01Q 5/40 343/846
2004/0090369 A1 * 5/2004 McCarrick ........... H01Q 9/0414 343/700 MS
2004/0239567 A1 * 12/2004 Van Der Poel ........ H01Q 21/24 343/700 MS
2012/0139805 A1 6/2012 Yu et al.
2015/0207213 A1 * 7/2015 Forslund ................ H01Q 17/00 343/713

(Continued)

FOREIGN PATENT DOCUMENTS

TW I464958 B 12/2014
TW 202023109 A 6/2020

*Primary Examiner* — Dameon E Levi
*Assistant Examiner* — Leah Rosenberg
(74) *Attorney, Agent, or Firm* — Li & Cai Intellectual Property Office

(57) ABSTRACT

An antenna structure is provided. The antenna structure includes a first insulating substrate, a second insulating substrate, a first antenna, a second antenna, a third antenna, a grounding element, and a feeding point. The first insulating substrate and the second insulating substrate are spaced apart from each other. The first antenna and the second antenna are respectively disposed on two side surfaces of the first insulating substrate. The first antenna has a first line of symmetry, and the second antenna has a second line of symmetry. The first line of symmetry and the second line of symmetry have an angle there-between, and the angle is within a range from 35 degrees to 55 degrees. The third antenna and the grounding element are respectively disposed on two side surfaces of the second insulating substrate. The feeding point is connected to the third antenna and the grounding element.

10 Claims, 14 Drawing Sheets

100A

(56) References Cited

U.S. PATENT DOCUMENTS

| | | | | |
|---|---|---|---|---|
| 2016/0126617 | A1* | 5/2016 | Jan | H01Q 9/0414<br>343/848 |
| 2019/0020110 | A1* | 1/2019 | Paulotto | H01Q 5/392 |
| 2019/0319364 | A1* | 10/2019 | Yang | H01Q 9/0414 |
| 2020/0021010 | A1* | 1/2020 | Ou | H01Q 21/065 |
| 2020/0106158 | A1* | 4/2020 | Gomez Angulo | G06F 1/1698 |
| 2020/0106192 | A1* | 4/2020 | Avser | H01Q 1/405 |
| 2020/0136269 | A1 | 4/2020 | Choi et al. | |
| 2020/0358203 | A1* | 11/2020 | Park | H01Q 9/045 |
| 2021/0135364 | A1* | 5/2021 | Yamada | H01Q 9/045 |

* cited by examiner

ANTENNA STRUCTURE

CROSS-REFERENCE TO RELATED PATENT APPLICATION

This application claims the benefit of priority to Taiwan Patent Application No. 111117060, filed on May 6, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure, and more particularly to an antenna structure that is three-dimensional.

BACKGROUND OF THE DISCLOSURE

Conventional antenna structures are designed as planar sheet-like structures. However, when the conventional antenna structures are disposed on an element (e.g., a substrate in a mobile phone), the conventional antenna structures will occupy a considerable area on the element, so that a size of a final product cannot be reduced. For example, when a side length of a conventional antenna structure is designed to be ½λ and is applied to ultra-high frequency radio frequency identification (i.e., UHF RFID), a side length of a conventional antenna structure having a frequency band within a range from 902 MHz to 928 MHz is bound to be greater than 16 cm.

Furthermore, when the aforementioned element requires a dual-band function, two different frequency band antenna structures (i.e., two separate systems having different frequency bands) need to be installed on the element. However, when the two separate systems having different frequency bands are installed on the element, a size of a final product also cannot be reduced.

SUMMARY OF THE DISCLOSURE

In response to the above-referenced technical inadequacy, the present disclosure provides an antenna structure.

In one aspect, the present disclosure provides an antenna structure. The antenna structure includes a first insulating substrate, a second insulating substrate, a first antenna, a second antenna, a third antenna, a grounding element, and at least one feeding point. The first insulating substrate and the second insulating substrate are spaced apart from each other. Each of the first insulating substrate and the second insulating substrate has two side surfaces that are opposite to each other. The first antenna is disposed on one of the two side surfaces of the first insulating substrate. The first antenna is in a symmetrical shape and has a first line of symmetry. The second antenna is disposed on another one of the two side surfaces of the first insulating substrate. The second antenna is in a symmetrical shape and has a second line of symmetry. The first line of symmetry and the second line of symmetry have a predetermined angle there-between, and the predetermined angle is within a range from 35 degrees to 55 degrees. The third antenna is disposed on one of the two side surfaces of the second insulating substrate that faces the first insulating substrate. The grounding element is disposed on another one of the two side surfaces of the second insulating substrate away from the first insulating substrate. The at least one feeding point is connected to the third antenna and the grounding element.

Therefore, in the antenna structure provided by the present disclosure, by virtue of "the first insulating substrate and the second insulating substrate being spaced apart from each other," "the first antenna and the second antenna being respectively disposed on the two side surfaces of the first insulation substrate, and the predetermined angle between the first line of symmetry of the first antenna and the second line of symmetry of the second antenna being within a range from 35 degrees to 55 degrees", and "the third antenna and the grounding element being respectively disposed on the two side surfaces of the second insulation substrate", the antenna structure being a single system can have a dual-band function, and an area occupied by the antenna structure can be more effectively decreased than an area occupied by an antenna structure having a planar structure and having a same gain when the antenna structure is disposed on an element.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
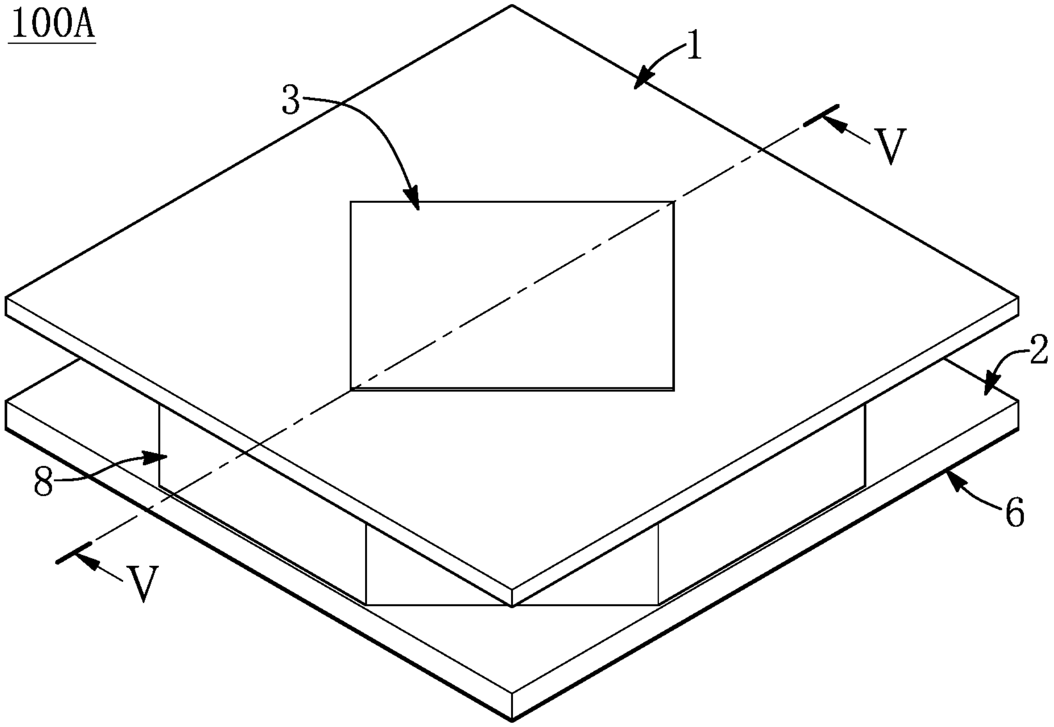
FIG. 1 is a schematic perspective view of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 7, a first embodiment of the present disclosure provides an antenna structure 100A, and a polarization mode of the antenna structure 100A is linear polarization. In other words, any antenna structure that does not have a linear polarization is not the antenna structure 100A of the present disclosure.

Figure 2:
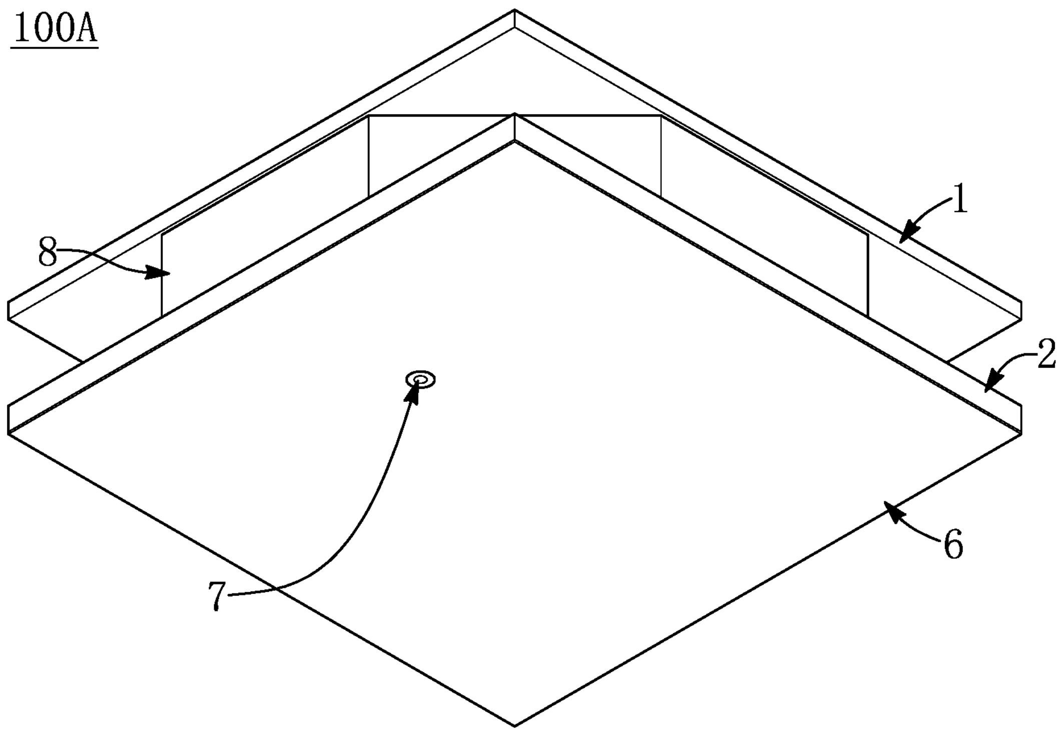
FIG. 2 is another schematic perspective view of the antenna structure according to the first embodiment of the present disclosure.
Figure 3:
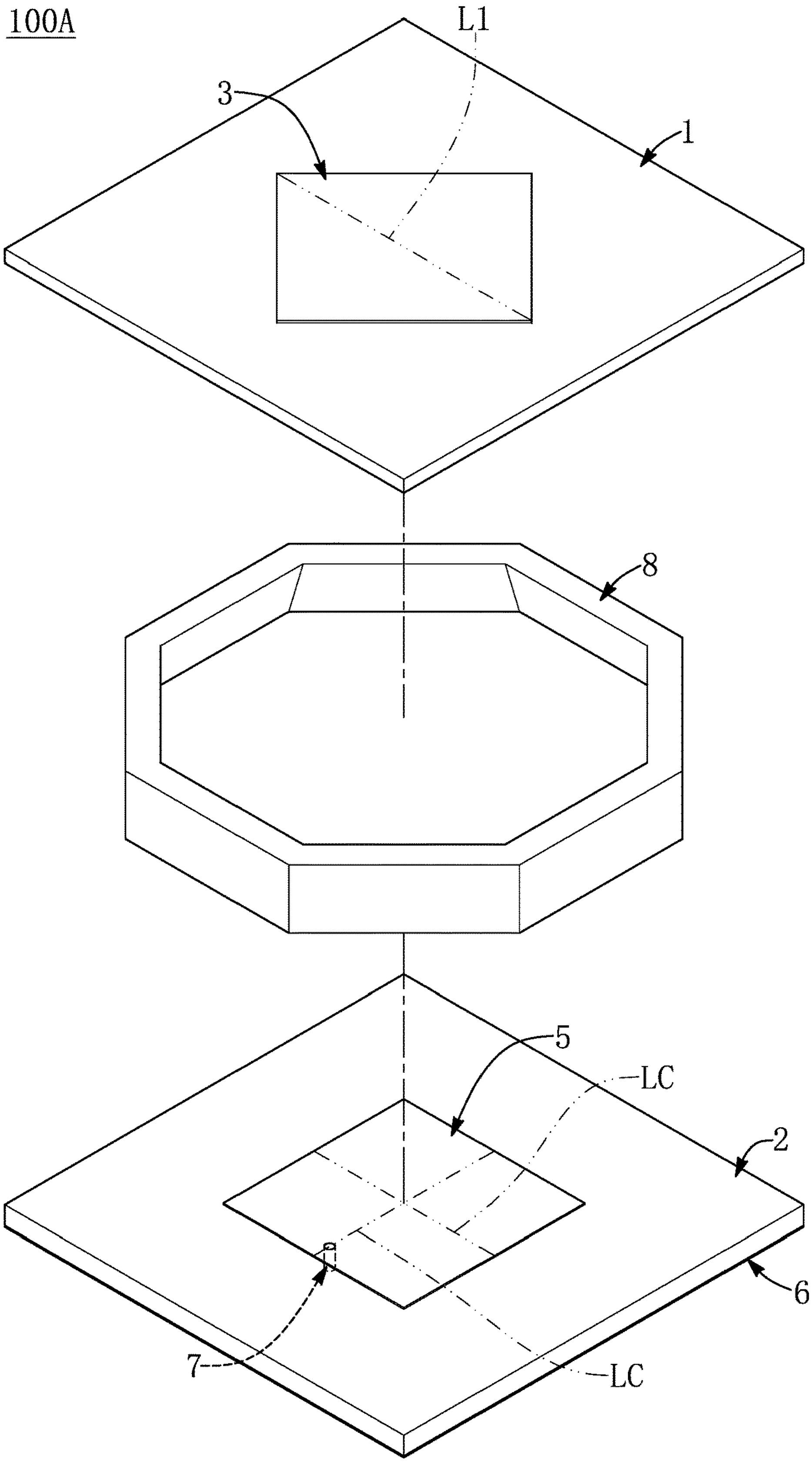
FIG. 3 is an exploded view of the antenna structure according to the first embodiment of the present disclosure.

Referring to FIG. 1 to FIG. 3, the antenna structure 100A includes a first insulating substrate 1, a second insulating substrate 2, a first antenna 3 and a second antenna 4 disposed on the first insulating substrate 1, a third antenna 5 and a grounding element 6 disposed on the second insulating substrate 2, and at least one feeding point 7 that is connected to the third antenna 5 and the grounding element 6.

Figure 4:
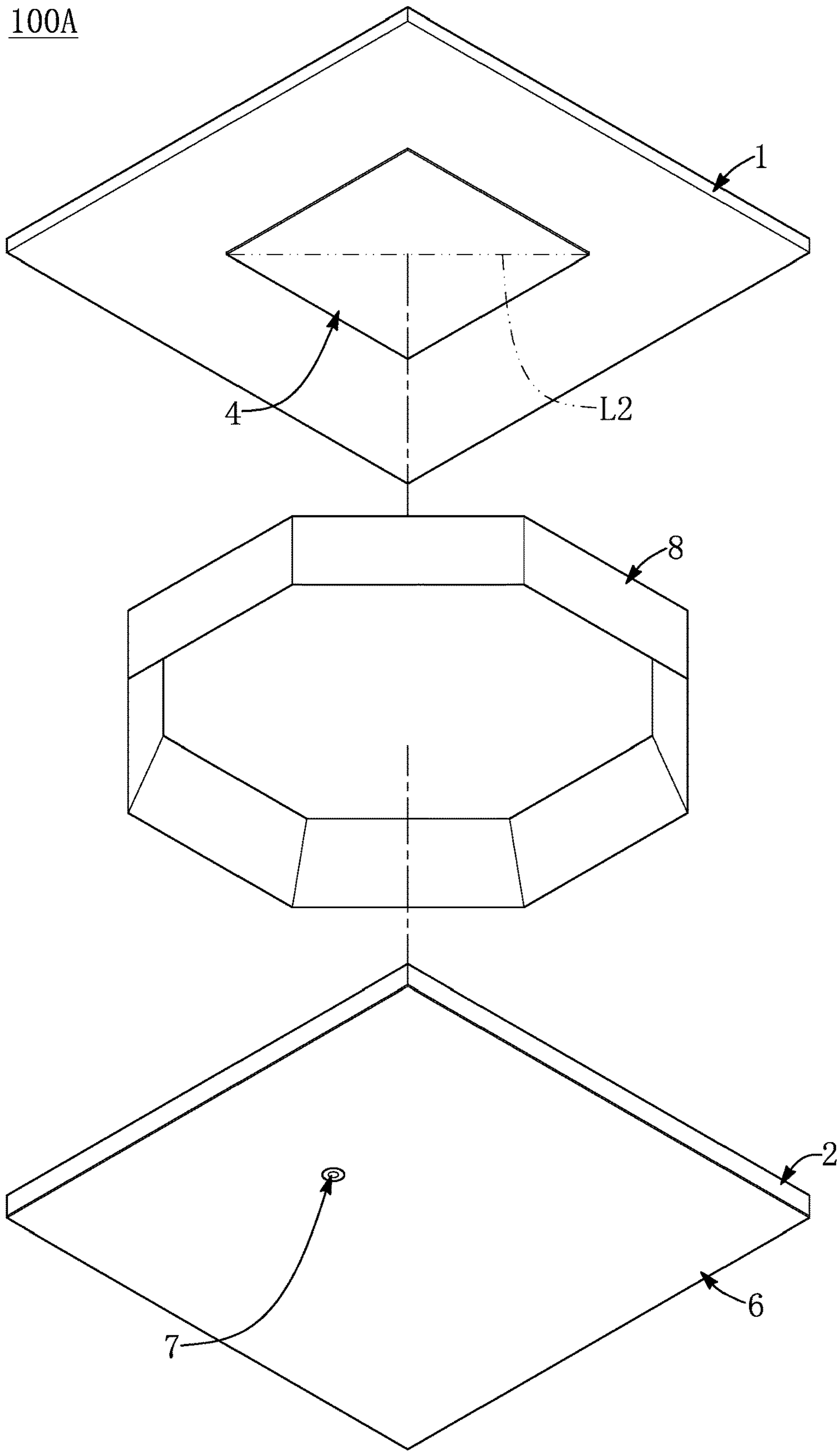
FIG. 4 is another exploded view of the antenna structure according to the first embodiment of the present disclosure.

Referring to FIG. 3 and FIG. 4, the first insulating substrate 1 and the second insulating substrate 2 in the present embodiment are each a plate-like structure that is in a rectangular shape. In other words, each of the first insulating substrate 1 and the second insulating substrate 2 has two opposite side surfaces (i.e., two wide side surfaces), and a size of the first insulating substrate 1 is substantially equal to that of the second insulating substrate 2. In a practical application, the first insulating substrate 1 and the second insulating substrate 2 may be printed circuit boards (PCB), but the present disclosure is not limited thereto. For example, in another embodiment of the present disclosure (not shown in the figures), the size of the first insulating substrate 1 and the size of the second insulating substrate 2 are not equal to each other, and the first insulating substrate 1 and the second insulating substrate 2 have two different shapes, respectively.

Figure 5:
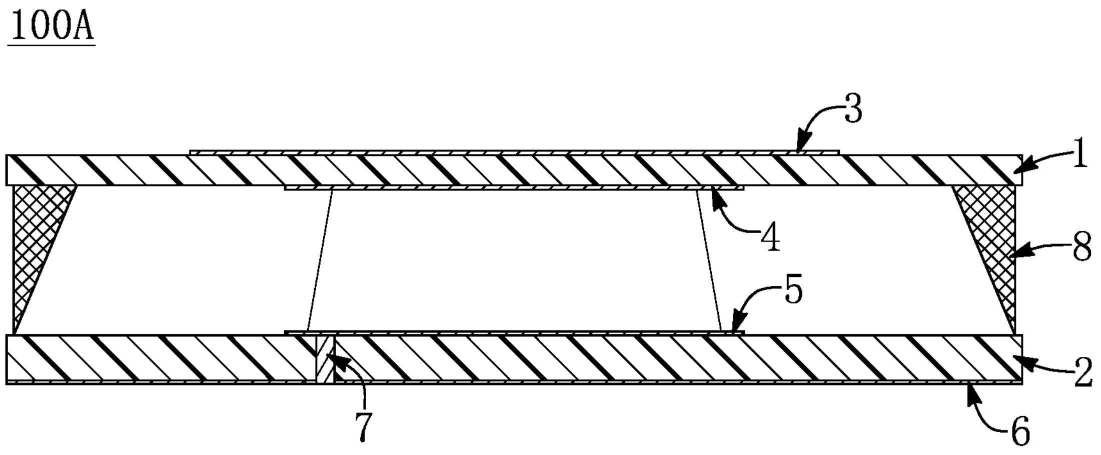
FIG. 5 is a cross-sectional view taken along line V-V of FIG. 1.

Referring to FIG. 3 to FIG. 5, the first insulating substrate 1 and the second insulating substrate 2 are spaced apart from each other and preferably parallel to each other, so that elements located on the first insulating substrate 1 (e.g., the first antenna 3 and the second antenna 4) can maintain a predetermined distance from elements located on the second insulating substrate 2 (e.g., the third antenna 5 and the grounding element 6).

In a practical application, the antenna structure 100A further includes a support frame 8 disposed between the first insulating substrate 1 and the second insulating substrate 2, and the first insulating substrate 1 and the second insulating substrate 2 can be kept at the predetermined distance by the support frame 8.

Preferably, the support frame 8 may be an annular structure that is made of an insulating material. A cross section of the support frame 8 is tapered from the first insulating substrate 1 toward the second insulating substrate 2 so as to be substantially a right-angled triangle, but the present disclosure is not limited thereto. In addition, the support frame 8 located between the first insulating substrate 1 and the second insulating substrate 2 can surround elements located on two side surfaces of the first insulating substrate 1 and the second insulating substrate 2 that face each other (e.g., the second antenna 4 and the third antenna 5).

Naturally, in another embodiment of the present disclosure (not shown in the figures), the support frame 8 can be omitted, and the first insulating substrate 1 and the second insulating substrate 2 can maintain the predetermined distance through other adjacent elements (e.g., other frames located in a final product).

Referring to FIG. 3 to FIG. 5, the first antenna 3 is a coupling antenna having a sheet-like structure, and the first antenna 3 is disposed on one of the two side surfaces of the first insulating substrate 1 (e.g., a side surface of the first insulating substrate 1 away from the second insulating substrate 2). The first antenna 3 in the present embodiment is in a rectangular shape and has two first lines of symmetry L1 (only one of the two first lines of symmetry L1 is shown in FIG. 3 and FIG. 6).

The second antenna 4 is a coupling antenna and a sheet-like structure, and the second antenna 4 is disposed on another one of the two side surfaces of the first insulating substrate 1 (e.g., a side surface of the first insulating substrate 1 that is adjacent to the second insulating substrate 2). The second antenna 4 in the present embodiment is in a rectangular shape and has two second lines of symmetry L2 (only one of the two first lines of symmetry L2 is shown in FIG. 4 and FIG. 6). In other words, the first antenna 3 and the second antenna 4 in the present embodiment are both in a symmetrical shape, and the shape of the first antenna 3 is substantially the same as the shape of the second antenna 4 (as shown in FIG. 3, FIG. 4, and FIG. 6).

Figure 6:
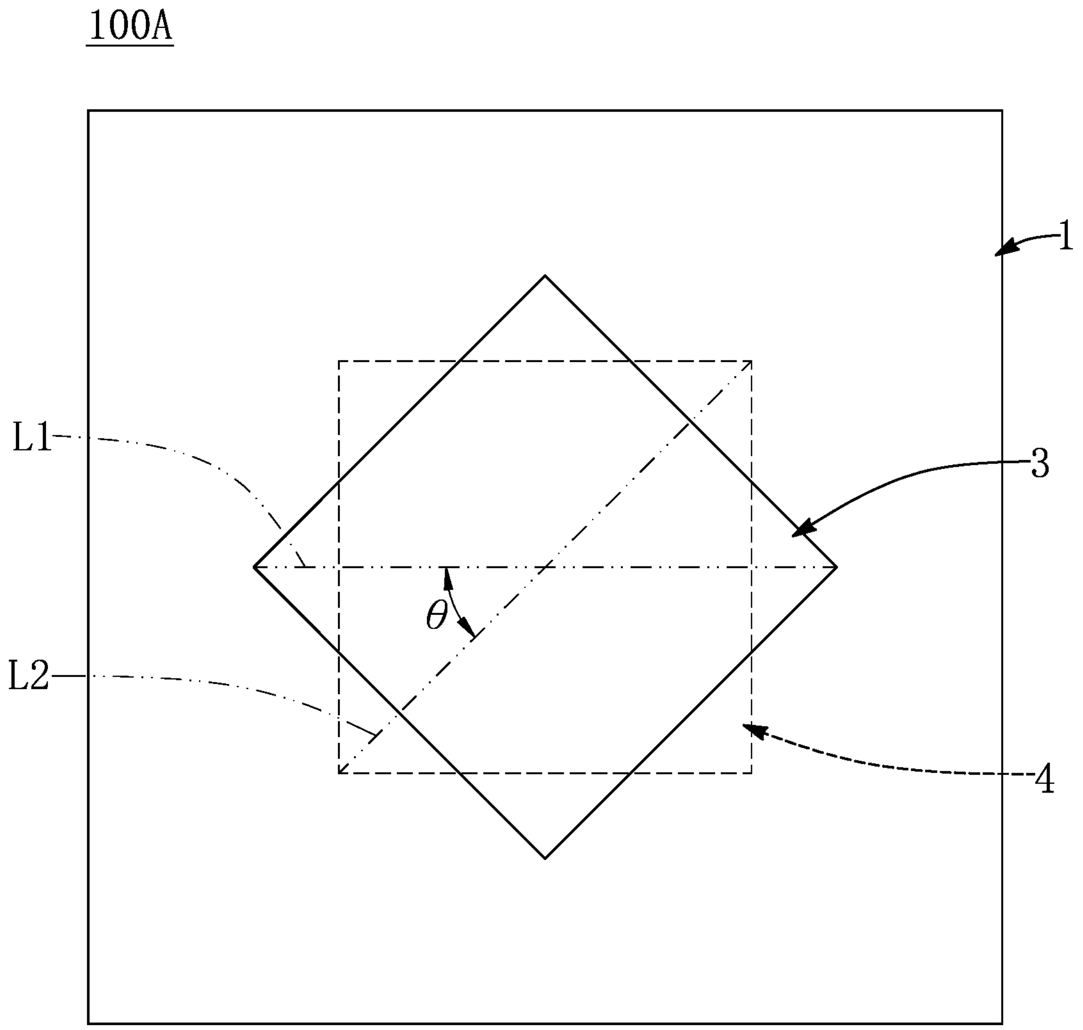
FIG. 6 is a schematic top view of FIG. 1.

Referring to FIG. 5 and FIG. 6, it is worth noting that a region defined by orthogonally projecting the first antenna 1 on the second insulating substrate 2 does not completely overlap a region defined by orthogonally projecting the second antenna 4 on the second insulating substrate 2. Specifically, any one of the two first lines of symmetry L1 of the first antennas 3 (a region defined by orthogonally projecting the one of the two first lines of symmetry L1 on the second insulating substrate 2) and any one of the two second lines of symmetry L2 of the second antennas 4 (a region defined by orthogonally projecting the one of the two second lines of symmetry L2 on the second insulating substrate 2) have a predetermined angle θ there-between, and the predetermined angle θ is within a range from 35 degrees to 55 degrees, so that a part of the first antenna 3 will not be blocked by the second antenna 4 and a part of the second antenna 4 will not be blocked by the first antenna 3.

Accordingly, a coupling amount of the first antenna 3 and a coupling amount of the second antenna 4 can be maintained at an ideal value when the first antenna 3 and the second antenna 4 are not blocked by each other. In order to reduce a mutual blocking region between the first antenna 3 and the second antenna 4, the predetermined angle θ is preferably 45 degrees.

Figure 9:
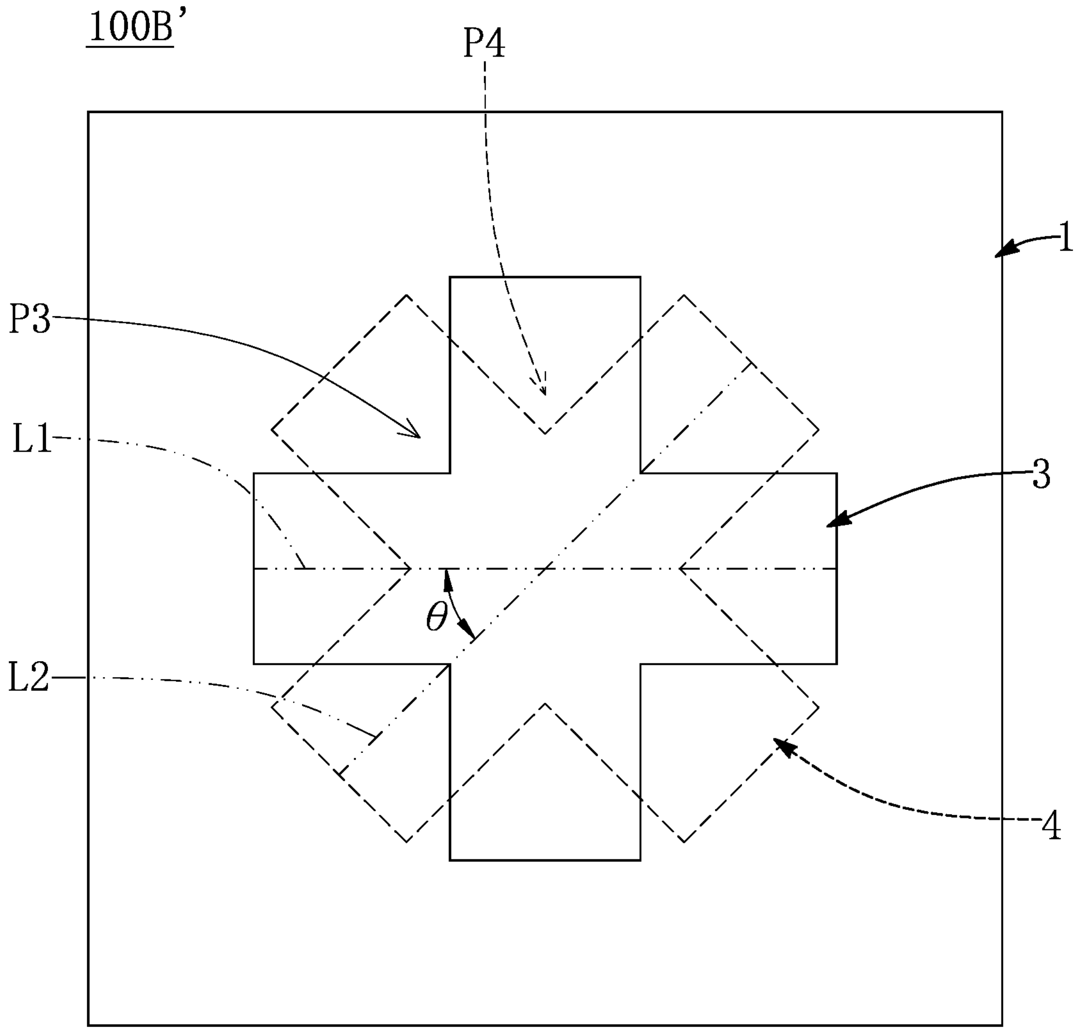
FIG. 9 is a schematic plan view of another one of the configurations of the antenna structure according to the second embodiment of the present disclosure.
Figure 10:
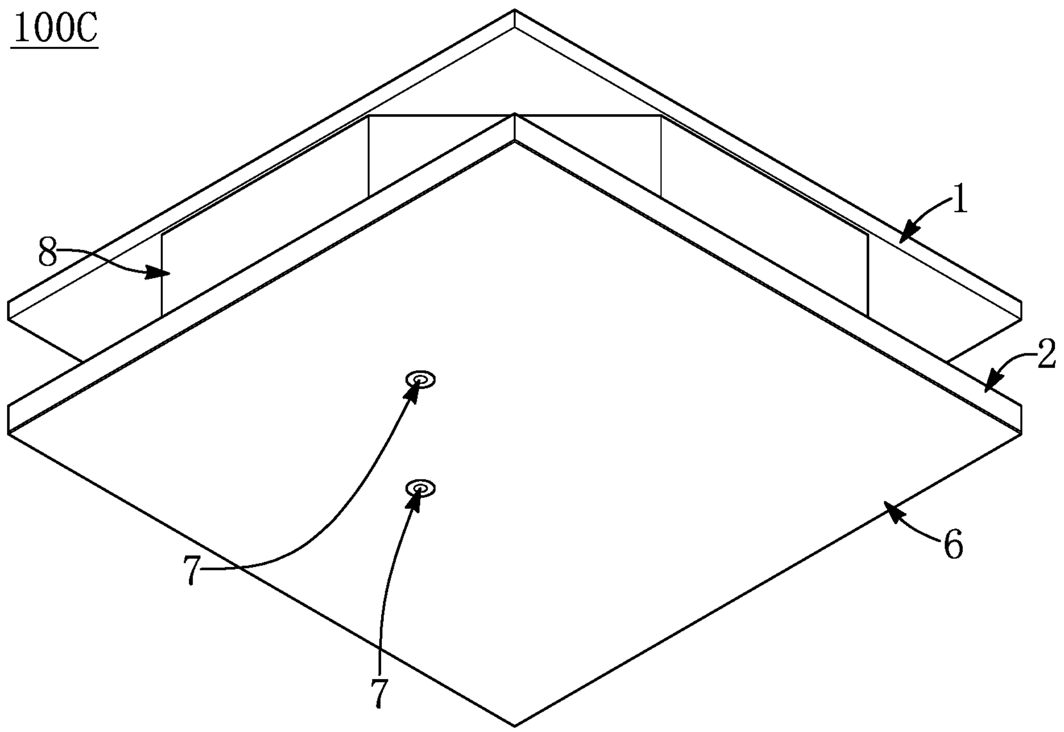
FIG. 10 is a schematic perspective view of the antenna structure according to a third embodiment of the present disclosure.

It should be noted that the first line of symmetry L1 and the second line of symmetry L2 in the present embodiment are diagonal lines of a rectangle, but the first line of symmetry L1 and the second line of symmetry L2 are not limited thereto. For example, the first line of symmetry L1 and the second line of symmetry L2 may also be center lines of a rectangle (e.g., an antenna structure 100B' as shown in FIG. 9).

In addition, a quantity of each of the first line of symmetry L1 and the second line of symmetry L2 in practice may be one. When the shape of the first antenna 3 and the shape of the second antenna 4 are the same, the first line of symmetry L1 and the second line of symmetry L2 correspond to each other.

Referring to FIG. 3, FIG. 5, and FIG. 6, the third antenna 5 is a sheet-like structure that is in a rectangular shape, and a shape of the third antenna 5 may be consistent with a shape of the first antenna 3 and a shape of the second antenna 4 (i.e., a rectangular shape), but the present disclosure is not limited thereto. For example, the shape of the third antenna 5 may also be different from the shapes of the first antenna 3 and the second antenna 4.

The third antenna 5 is disposed on a side surface of the second insulating substrate 2 facing the first insulating substrate 1, and the third antenna 5 may correspond in position to the first antenna 3 or the second antenna 4. When a frequency value of the first antenna 3 is close to a frequency value of the second antenna 4 and a material of the first antenna 3 is the same as a material of the second antenna 4, an area defined by orthogonally projecting at least one of first antenna 3 and the second antenna 4 on the second insulating substrate 2 is substantially equal to an area defined by orthogonally projecting the third antenna 3 on the second insulating substrate 2 (as shown in FIG. 3 to FIG. 5).

In other words, the size of the first antenna 3, the size of the second antenna 4, and the size of the third antenna 5 may be the same. Or, the size of the first antenna 3 or the size of the second antenna 4 (that is, the size of the first antenna 3 and the size of the second antenna 4 are different) is the same as the size of the third antenna 5.

Referring to FIG. 4 and FIG. 5, the grounding element 6 in the present embodiment is a sheet-like structure that is in a rectangular shape, and the grounding element 6 is disposed on a side surface of the second insulating substrate 2 away from the first insulating substrate 1. A side of the grounding element 6 is flush with a side of the second insulating substrate 2, and in practical application, an area (of a broad side surface) of the grounding element 6 may be greater than an area (of a broad side surface) of each of the first antenna 3, the second antenna 4, and the third antenna 5, but the present disclosure is not limited thereto.

Referring to FIG. 3 to FIG. 5, a quantity of the at least one feeding point 7 in the present embodiment is one, and the feeding point 7 penetrates through the second insulating substrate 2 to connect the third antenna 5 and the grounding element 6. Accordingly, the feeding point 7 can produce a linear polarization by using a position thereof to cooperate with the first antenna 3, the second antenna 4, the third antenna 5, and the grounding element 6. Since the way that the feeding point 7 produces the linear polarization by using the position thereof is known to those skilled in the art, details thereof will not be described herein.

Figure 7:
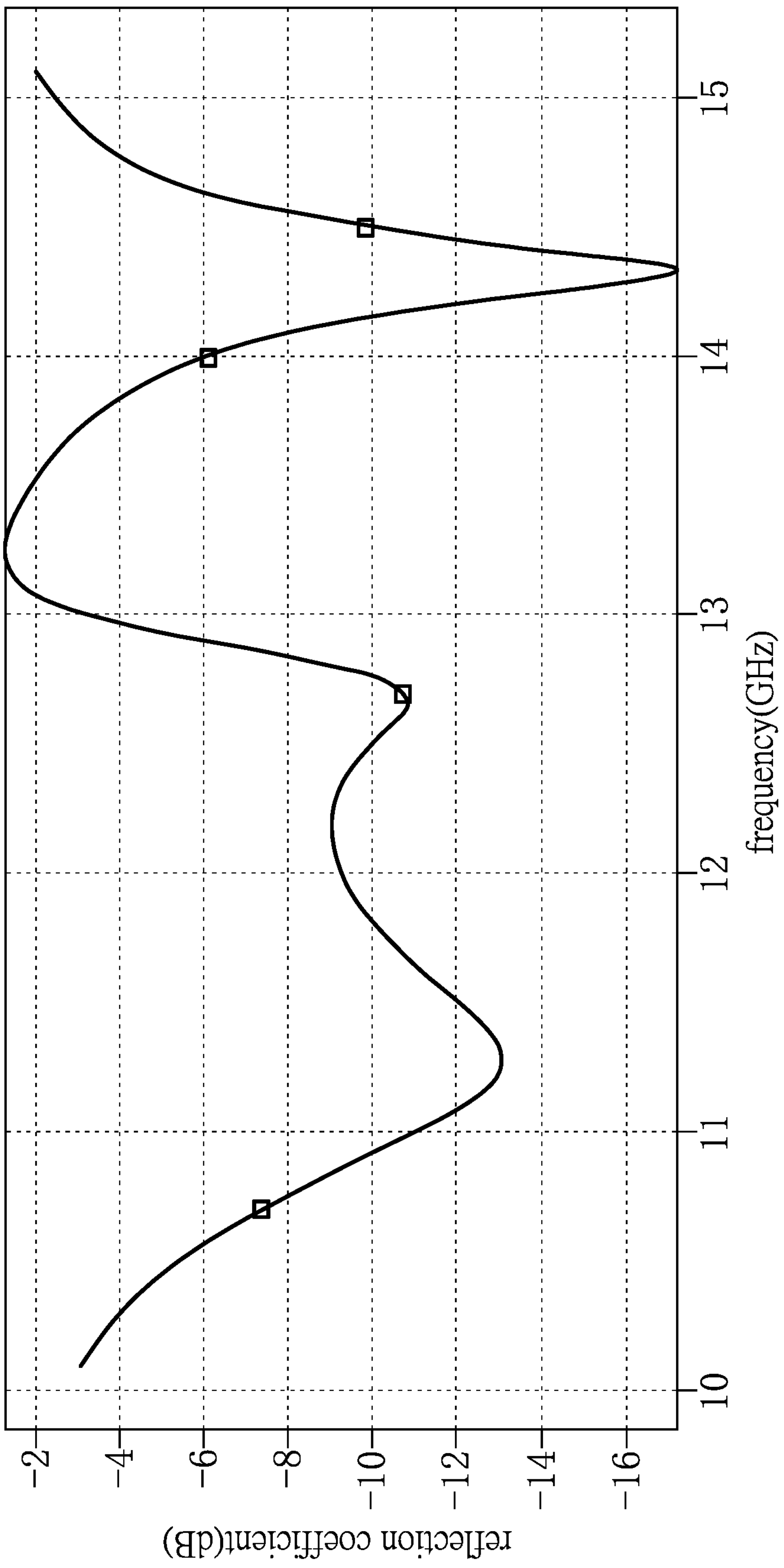
FIG. 7 is a relation diagram of a reflection coefficient and a frequency of the antenna structure according to the first embodiment of the present disclosure.

In addition, the antenna structure 100A of the present embodiment can achieve the effect of dual frequency bands by a cooperation between the first antenna 3, the second antenna 4, and the third antenna 5. Referring to FIG. 7, in a practical application, the antenna structure 100A of the present embodiment may have a transmission frequency band within a range from 10 GHz to 12.7 GHz and a receiving frequency band within a range from 14 GHz to 14.5 GHz, but the present disclosure is not limited thereto.

Second Embodiment

Figure 8:
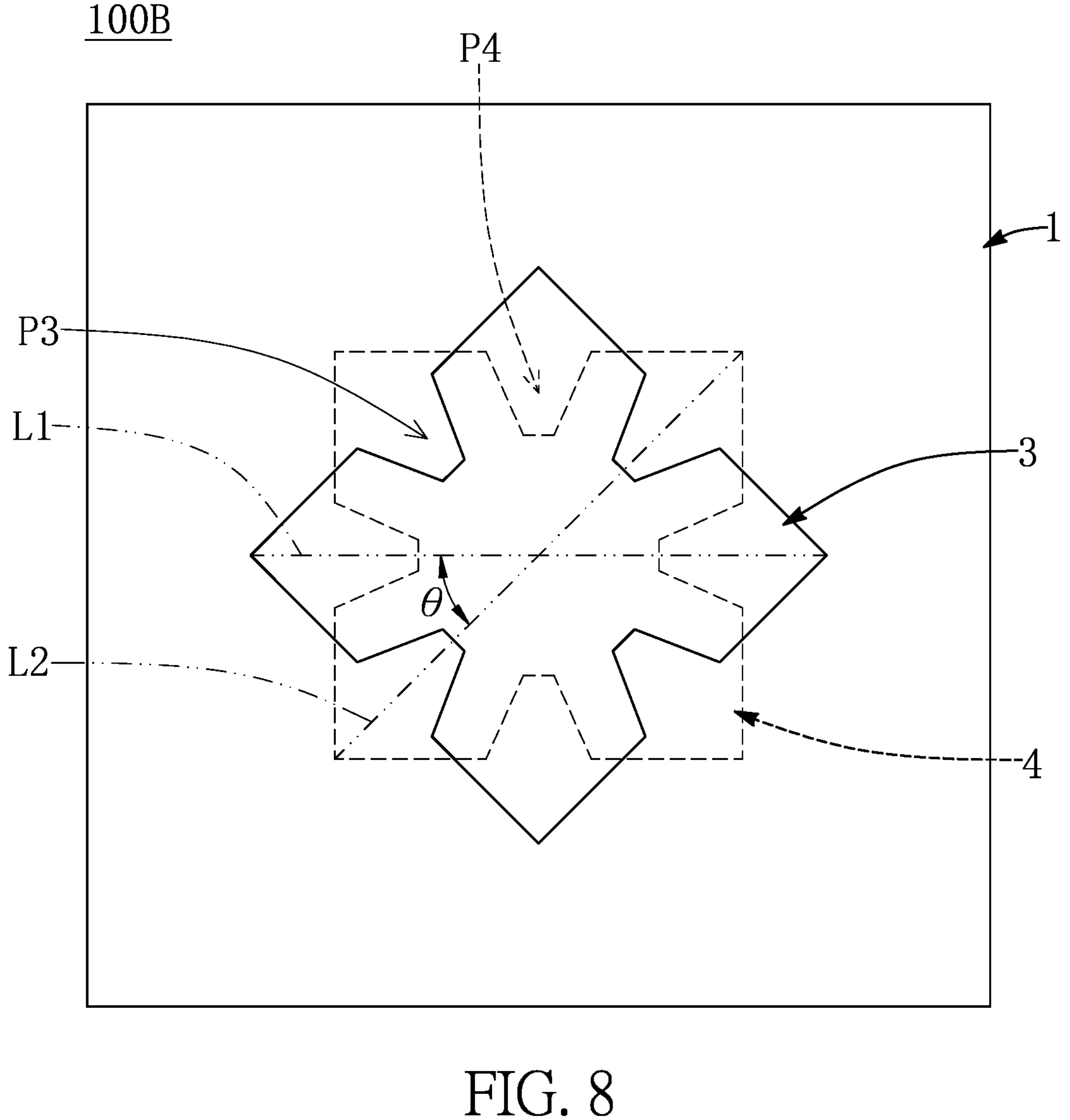
FIG. 8 is a schematic plan view of one of the configurations of the antenna structure according to a second embodiment of the present disclosure.

Referring to FIG. 8 to FIG. 9, a second embodiment of the present disclosure provides an antenna structure 100B. The antenna structure 100B in the present embodiment is similar to the antenna structure 100A in the first embodiment, and the similarities therebetween will not be repeated herein. The difference between the present embodiment and the first embodiment are as follows.

Referring to FIG. 8, each of the first antenna 3 and the second antenna 4 has four notches P3, P4, each of positions of the four notches P3 of the first antenna 3 corresponds to a position between any two adjacent corners of the second antenna 4, and each of positions of the four notches P4 of the second antenna 4 corresponds to a position between any two adjacent corners of the first antenna 3.

For example, in the antenna structure 100B shown in FIG. 8, when the four notches P3 of the first antenna 3 and the four notches P4 of the second antenna 4 are each in the shape of a trapezoid, the first antenna 3 and the second antenna 4 are substantially in the shape of a snowflake.

In addition, in the antenna structure 100B' shown in FIG. 9, the four notches P3 of the first antenna 3 may be located at diagonal positions of the first antenna 3, the four notches P4 of the second antenna 4 may be located at diagonal positions of the second antenna 4, and the four notches P3 of the first antenna 3 and the four notches P4 of the second antenna 4 are each in the shape of a rectangle, so that the first antenna 3 and the second antenna 4 are substantially in the shape of a cross.

Accordingly, the first antenna 3 and the second antenna 4 can reduce an area blocked by each other, so as to increase a coupling amount of the first antenna 3 and a coupling amount of the second antenna 4. In other words, the antenna structure 100B in the present embodiment can have a more ideal coupling amount than the antenna structure 100A in the first embodiment.

Naturally, in another embodiment of the present disclosure (not shown in the figures), the quantities of the notches of each of the first antenna 3 and the second antenna 4 may also be two. The positions of the two notches P3 of the first antenna 3 are located on two non-adjacent diagonal corners of the first antenna 3, and the positions of the two notches P4 of the second antenna 4 are located on two non-adjacent diagonal corners of the second antenna 4.

In other words, the two non-adjacent diagonal corners of the first antenna 3 and the two non-adjacent diagonal corners of the second antenna 4 are replaced by the two notches P3 and the two notches P4, so that the first antenna 3 and the second antenna 4 are substantially in the shape of a double arrow (that is, the first antenna 3 and the second antenna 4 have a two-fold rotational symmetry relationship). Furthermore, the first antenna 3 and the second antenna 4 respectively have a first line of symmetry and a second line of symmetry that corresponds in position to the first line of symmetry, and the first line of symmetry and the second line of symmetry have an angle of 45 degrees there-between. Accordingly, the first antenna 3 and the second antenna 4 also have the same effect (i.e., having a more ideal coupling amount).

Third Embodiment

Referring to FIG. 11 to FIG. 14, a third embodiment of the present disclosure provides an antenna structure 100C. The antenna structure 100C in the present embodiment is similar to the antenna structure 100A in the first embodiment, and the similarities therebetween will not be repeated herein. The difference between the present embodiment and the first embodiment are as follows.

Figure 11:
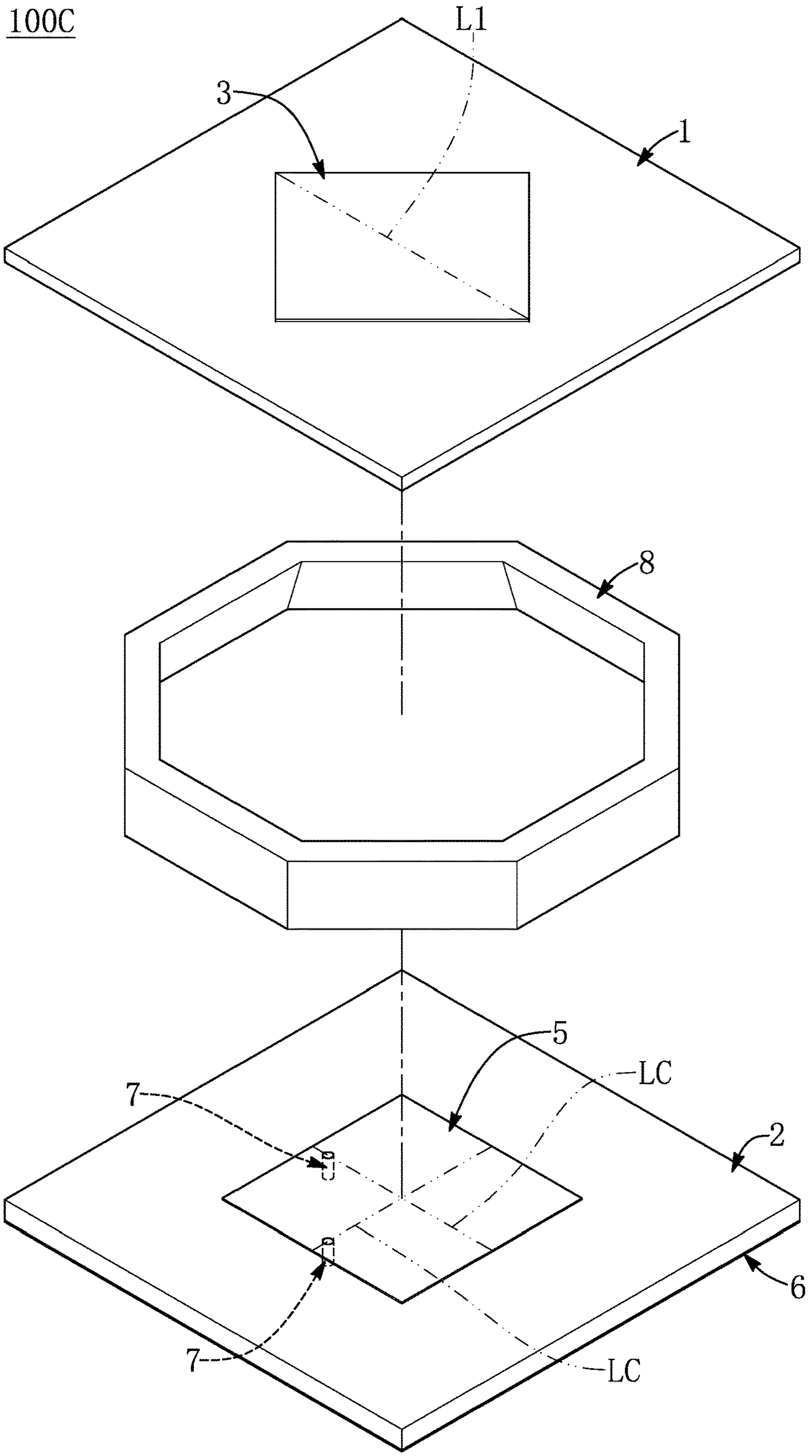
FIG. 11 is an exploded view of the antenna structure according to the third embodiment of the present disclosure.

Referring to FIG. 11, a quantity of the antenna structure 100C in the present embodiment is two feeding points 7, and a phase difference between the two feeding points 7 is 90 degrees to produce a circular polarization. That is, the polarization mode of the antenna structure 100C in the present embodiment is circular polarization. In other words, any antenna structure that does not have a circular polarization is not the antenna structure 100C of the present disclosure.

In more detail, in the present embodiment, the third antenna 5 has two center lines LC that have an angle of 90 degrees there-between. The two feeding points 7 on the second insulating substrate 2 correspond in position to the two center lines LC of the third antenna 5, respectively. Accordingly, the two feeding points 7 can produce a circular polarization by using positions thereof to cooperate with the first antenna 3, the second antenna 4, the third antenna 5, and the grounding element 6. Since the way that the two feeding points 7 produce the circular polarization by using the positions thereof (e.g., having the two frequencies not match each other) is known to those skilled in the art, details thereof will not be described herein.

Figure 13:
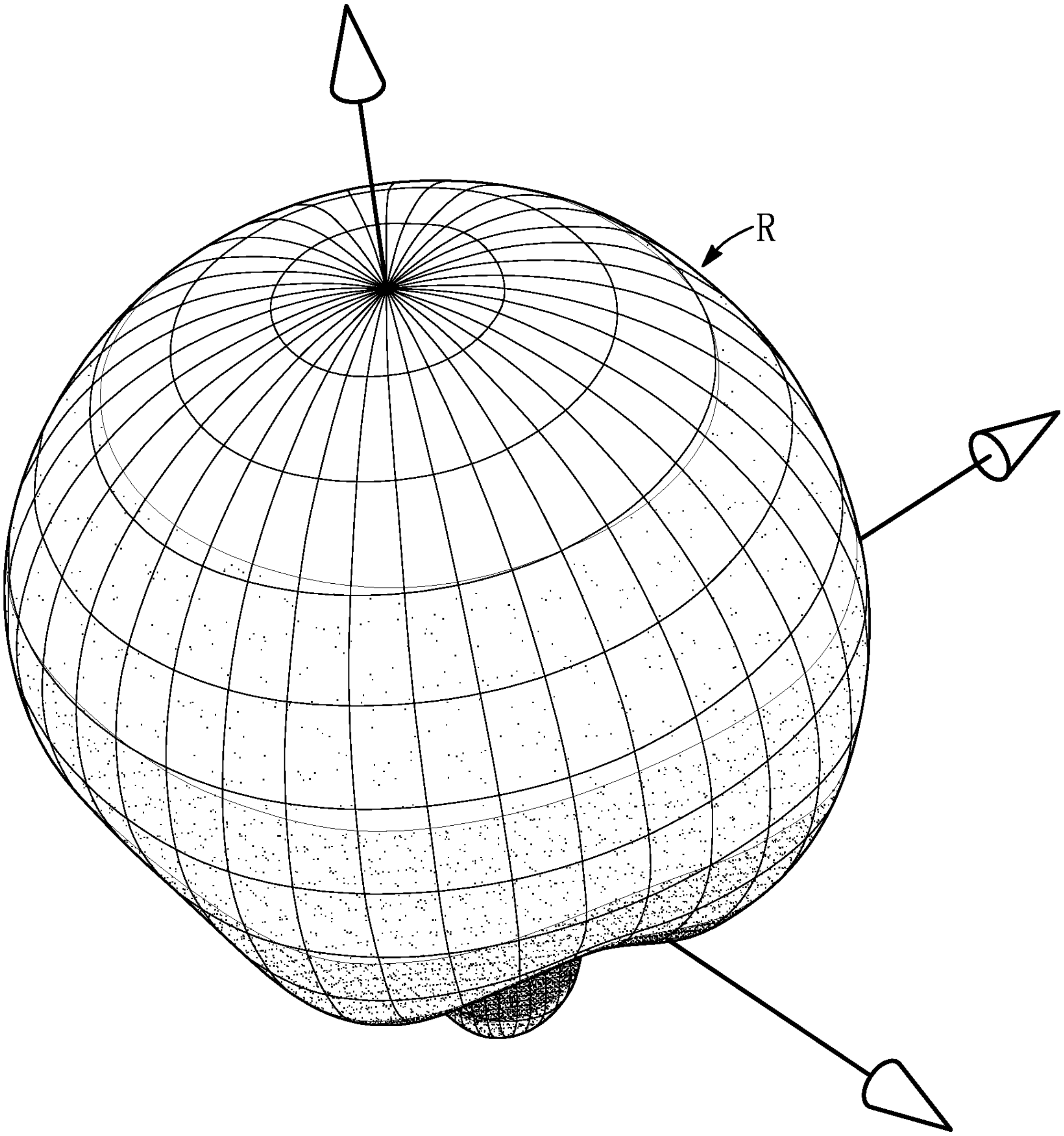
FIG. 13 is a schematic diagram of a radiation pattern produced by the antenna structure according to the third embodiment of the present disclosure.
Figure 14:
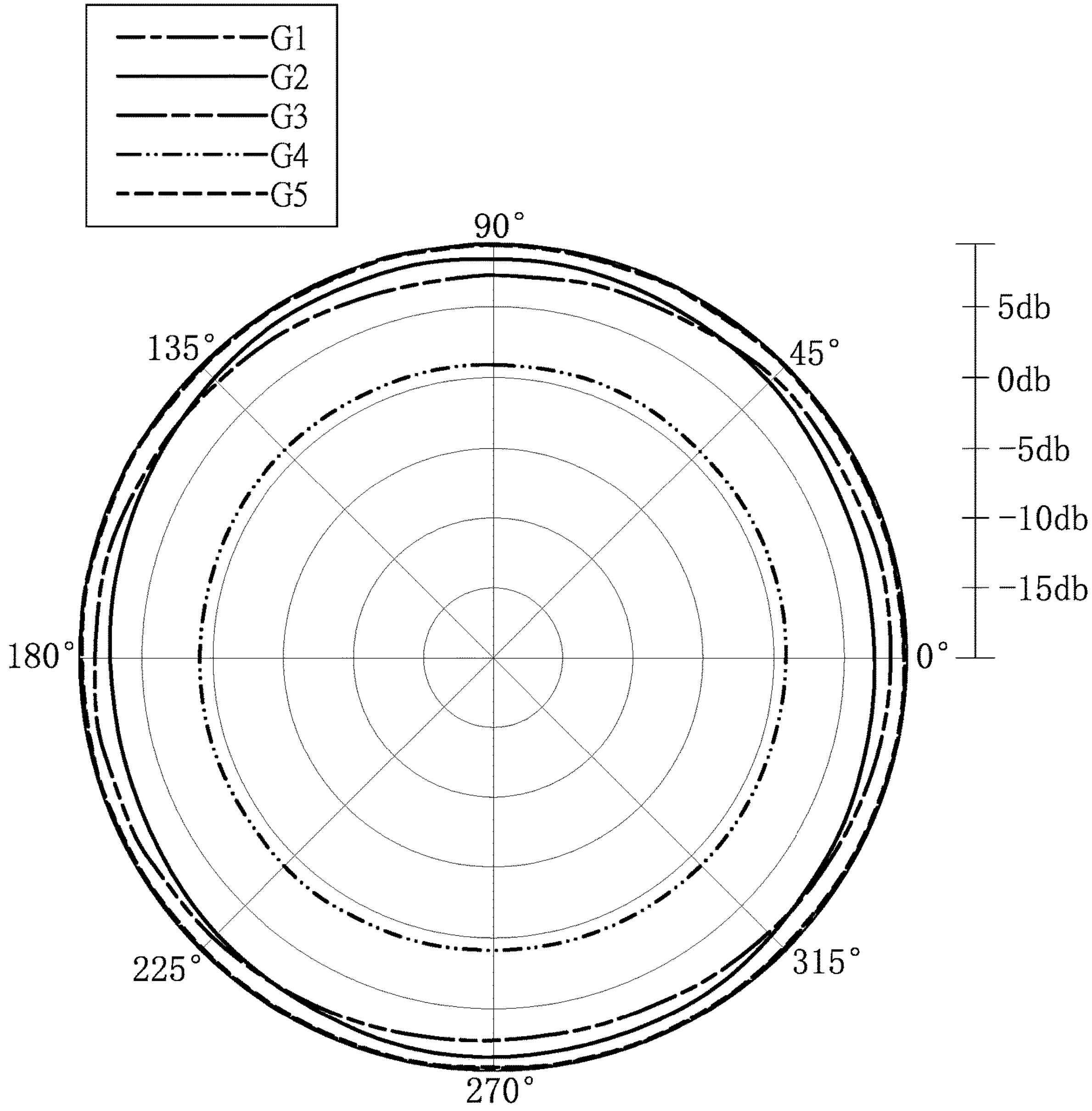
FIG. 14 is a schematic diagram of the radiation pattern of the antenna structure in an E-plane or an H-plane according to the third embodiment of the present disclosure.

Referring to FIG. 13 and FIG. 14, FIG. 13 is a schematic diagram of a radiation pattern R of the antenna structure 100C within a frequency (e.g., 14.25 GHz) according to the present embodiment, and FIG. 14 is a schematic diagram of the radiation pattern R in an E-plane and an H-plane.

When a dot density in FIG. 13 is lower, a gain value is higher. The schematic diagram in FIG. 14 has five lines G1 to G5, in which the line G1 is a total gain value, the line G2 is the gain value in a θ direction, the line G3 is the gain value in a 4 direction, the line G4 is the gain value in a left direction, and the line G5 is the gain value in a right direction. It can be known from FIG. 13 to FIG. 14 that, the radiation pattern of the antenna structure 100C is substantially a circle.

In addition, it is worth noting that, the antenna structure can also produce the circular polarization through a single feeding point 7. Specifically, the feeding point 7 is located at a non-center position of the third antenna 5, so that distances between the feeding point 7 and four sides of the third antenna 5 are not equal. Accordingly, the feeding point 7 can be disturbed by a distance difference between the feeding point 7 and the third antenna 5, so as to produce the circular polarization.

Figure 12:
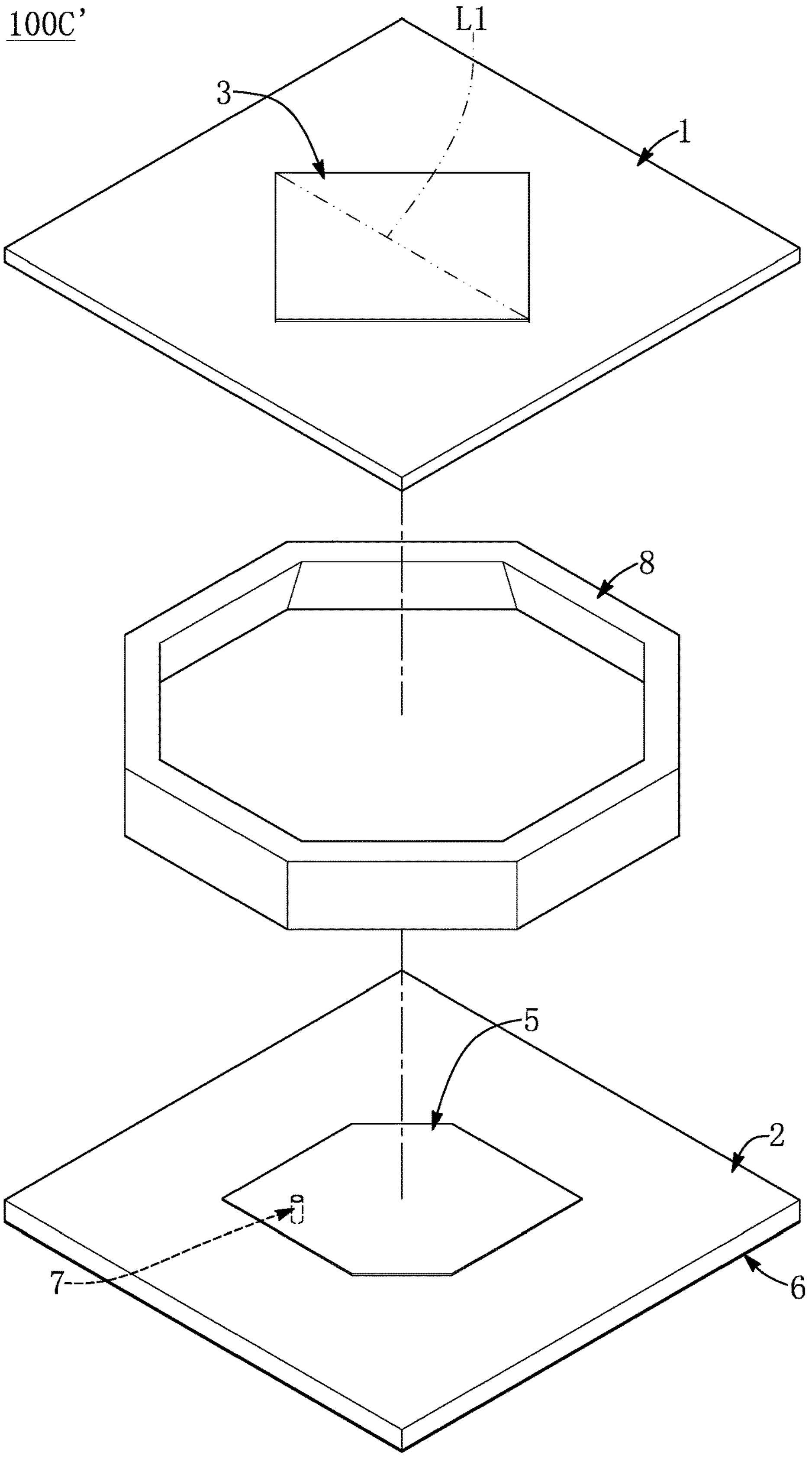
FIG. 12 is an exploded view of another configuration of the antenna structure according to the third embodiment of the present disclosure.

For example, in the antenna structure 100C' shown in FIG. 12, the feeding point 7 is located on a diagonal line of the third antenna 5 and is adjacent to a side of the third antenna 5, and the non-adjacent two of the diagonal corners of the third antenna 5 may be truncated, so that the distances between the feeding point 7 and the four sides of the third antenna 5 are not equal.

Naturally, since the circular polarization can be achieved by the feeding point 7 through other means (e.g., by using a microstrip) that are known to those skilled in the art, details thereof will not be described herein.

Beneficial Effects of the Embodiments

In conclusion, in the antenna structure provided by the present disclosure, by virtue of "the first insulating substrate and the second insulating substrate being spaced apart from each other," "the first antenna and the second antenna being respectively disposed on the two side surfaces of the first insulation substrate, and the predetermined angle between the first line of symmetry of the first antenna and the second line of symmetry of the second antenna being within a range from 35 degrees to 55 degrees", and "the third antenna and the grounding element being respectively disposed on the two side surfaces of the second insulation substrate", the antenna structure being a single system can have a dual-band function, and an area occupied by the antenna structure can be more effectively decreased than an area occupied by an antenna structure having a planar structure and having a same gain when the antenna structure is disposed on an element.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a first insulating substrate and a second insulating substrate spaced apart from each other, wherein each of the first insulating substrate and the second insulating substrate has two side surfaces that are opposite to each other;

a first antenna disposed on one of the two side surfaces of the first insulating substrate, wherein the first antenna is in a symmetrical shape and has a first line of symmetry;

a second antenna disposed on another one of the two side surfaces of the first insulating substrate, wherein a geometric center of a region defined by orthogonally projecting the second antenna on the second insulating substrate overlaps a geometric center of a region defined by orthogonally projecting the first antenna on the second insulating substrate, wherein the second antenna is in a symmetrical shape and has a second line of symmetry, and wherein the first line of symmetry and the second line of symmetry have a predetermined angle there-between, and the predetermined angle is within a range from 35 degrees to 55 degrees;

a third antenna disposed on one of the two side surfaces of the second insulating substrate that faces the first insulating substrate;

a grounding element disposed on another one of the two side surfaces of the second insulating substrate away from the first insulating substrate; and at least one feeding point connected to the third antenna.

2. The antenna structure according to claim 1, wherein the first insulating substrate and the second insulating substrate are parallel to each other, a shape of the first antenna is the same as that of the second antenna, and the predetermined angle is 45 degrees.

3. The antenna structure according to claim 1, wherein each of the first antenna and the second antenna is in a rectangular shape and has two notches; wherein each of the two notches of the first antenna corresponds in position to a position between any two adjacent corners of the second antenna, and each of the two notches of the second antenna corresponds in position to a position between any two adjacent corners of the first antenna.

4. The antenna structure according to claim 1, wherein a quantity of the at least one feeding point is two; wherein a phase difference between the two feeding points is 90 degrees so as to produce a circular polarization.

5. The antenna structure according to claim 1, further comprising a support frame disposed between the first insulating substrate and the second insulating substrate.

6. The antenna structure according to claim 5, wherein a cross section of the support frame is tapered from the first insulating substrate toward the second insulating substrate.

7. The antenna structure according to claim 5, wherein the support frame disposed between the first insulating substrate and the second insulating substrate surrounds the second antenna and the third antenna.

8. The antenna structure according to claim 1, wherein, a material of the first antenna is the same as a material of the second antenna, and an area defined by orthogonally projecting at least one of the first antenna and the second antenna on the second insulating substrate is equal to an area defined by orthogonally projecting the third antenna on the second insulating substrate.

9. The antenna structure according to claim 1, wherein a quantity of the at least one feeding point is one; wherein the feeding point produces a disturbance by a distance difference between the third antenna and the feeding point so as to produce a circular polarization.

10. The antenna structure according to claim 1, wherein a quantity of the at least one feeding point is one; wherein the feeding point produces a linear polarization.

* * * * *